United States Patent
Zhao et al.

(10) Patent No.: US 12,214,659 B2
(45) Date of Patent: Feb. 4, 2025

(54) POWER TAKE-OFF (PTO) ASSEMBLY IN A TRANSMISSION AND PTO ASSEMBLY OPERATING METHOD

(71) Applicant: DANA (WUXI) TECHNOLOGY CO., LTD., Suzhou (CN)

(72) Inventors: Weiguo Zhao, Wuxi (CN); Filip D. Schacht, Meulebeke (BE); Quan Liu, Wuxi (CN)

(73) Assignee: DANA (WUXI) TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/523,236

(22) Filed: Nov. 29, 2023

(65) Prior Publication Data

US 2024/0174079 A1 May 30, 2024

(30) Foreign Application Priority Data

Nov. 30, 2022 (CN) .......................... 202223212232.2

(51) Int. Cl.
*B60K 17/28* (2006.01)
*F16H 37/06* (2006.01)

(52) U.S. Cl.
CPC ........... *B60K 17/28* (2013.01); *F16H 37/065* (2013.01)

(58) Field of Classification Search
CPC .. B60K 17/28; B60K 2025/005; B60K 17/02; B60K 17/344; B60K 1/02; B60K 17/08; F16H 37/065; F16H 2200/0021; F16H 3/003; F16H 3/10; F16H 3/54; F16H 2200/0034; F16H 2200/2005; B60Y 2400/424; B60Y 2400/61
See application file for complete search history.

(56) References Cited

U.S. PATENT DOCUMENTS

| | | | |
|---|---|---|---|
| 4,538,475 A * | 9/1985 | Igarashi | F16H 3/10 477/194 |
| 8,733,191 B2 | 5/2014 | Oliver | |
| 9,327,728 B2 | 5/2016 | Gibson et al. | |
| 9,434,252 B2 | 9/2016 | Heindl | |
| 9,541,147 B2 * | 1/2017 | Isoda | F16D 3/50 |

FOREIGN PATENT DOCUMENTS

| | | | | |
|---|---|---|---|---|
| BR | 9604232 A * | 5/1998 | | B60K 6/365 |
| BR | 112018004900 A2 * | 10/2018 | | F16D 41/00 |
| DE | 102017203026 A1 * | 8/2017 | | B60K 6/20 |
| DE | 102018218908 A1 * | 6/2019 | | B60K 17/08 |

* cited by examiner

*Primary Examiner* — Karen Beck

(74) *Attorney, Agent, or Firm* — McCoy Russell LLP

(57) ABSTRACT

Power take-off (PTO) systems and methods. A PTO assembly, in one example, includes a first one-way clutch configured to engage with a shaft of a prime mover or an output shaft when the prime mover rotates in a first direction and a second one-way clutch configured to engage with the shaft of the prime mover or the output shaft when the prime mover rotates in second direction which is opposite the first direction. The PTO assembly further includes a first mechanical branch rotationally coupling the first one-way clutch to the output shaft or the prime mover shaft and a second mechanical branch rotationally coupling the second one-way clutch to the output shaft or the prime mover shaft.

20 Claims, 5 Drawing Sheets

POWER TAKE-OFF (PTO) ASSEMBLY IN A TRANSMISSION AND PTO ASSEMBLY OPERATING METHOD

CROSS-REFERENCE TO RELATED APPLICATION

The present application claims priority to Chinese Utility Model Application No. 202223212232.2, entitled "POWER TAKE-OFF (PTO) ASSEMBLY IN A TRANSMISSION AND PTO ASSEMBLY OPERATING METHOD", and filed on Nov. 30, 2022. The entire contents of the above-listed application is hereby incorporated by reference for all purposes.

TECHNICAL FIELD

The present disclosure relates to a transmission with a power take-off (PTO) assembly that is configured for bi-directional inputs.

BACKGROUND AND SUMMARY

Transmissions have been deployed in certain vehicles due to their increased responsiveness and gains in prime mover operating efficiency that the transmission affords. Moreover, certain drivelines make use of electric or hydraulic motors that can easily provide forward drive and reverse drive rotational inputs to the transmission, enabling the vehicle to be effectively switched between forward and reverse drive. The bi-directional motor rotation presents barriers to the use of power take-off (PTO) systems which drive auxiliaries in the driveline, particularly in PTO systems that demand uni-directional rotational input for the PTO pump.

Some attempts have been made to provide PTO functionality into certain vehicle systems. For instance, U.S. Pat. No. 10,336,187 B2 to Horsfall et al. discloses a planetary power take off device for a vehicle transmission. The power take off device includes a clutch and a brake unit that enable the ratio of the power take off device to be altered to expand the device's operating window. Further, Horsfall's device is configured to drive an output shaft in both forward and reverse directions.

The inventors have recognized several drawbacks with Horsfall's device as well as other previous PTO devices. For instance, Horsfall's device may be bulky, complex, and costly when compared to devices that are not capable of driving the output shaft in both forward and reverse directions. Therefore, Horsfall's device may have limited applicability particularly in space constrained applications. Further, Horsfall's power take off device may be prone to degradation due to its complexity. Further, if PTO systems were to use bi-directional pumps in the system to enable the pump to be driven in both forward and reverse directions, the bi-direction pumps have constrained maximum pressure that are less than uni-directional pumps. Consequently, the maximum pressure constraints of the bi-directional pump may prevent the pump from hydraulically powering auxiliaries with high pressure demands, such as charging pumps for instance. Further, the use of bi-directional pumps would increase PTO system costs when compared to uni-directional pumps. Other prior PTO systems have made use of additional electric motors which drive a PTO pump. The extra motor adds cost and complexity to the PTO system.

The inventors have recognized the aforementioned issues and developed a PTO assembly to at least partially overcome the aforementioned challenges. The PTO assembly includes a first one-way clutch configured to engage with a shaft of a prime mover or an output shaft when the prime mover rotates in a first direction. The PTO assembly further includes a second one-way clutch configured to engage with the shaft of the prime mover or the output shaft when the prime mover rotates in second direction which is opposite the first direction. The PTO assembly further includes a first mechanical branch that rotationally couples the first one-way clutch to the output shaft or the prime mover shaft and a second mechanical branch that rotationally couples the second one-way clutch to the output shaft or the prime mover shaft. The PTO assembly further includes a PTO device that is rotationally coupled to the output shaft. The one-way clutches in conjunction with the mechanical branches allow the PTO device to be uni-directionally driven when the prime mover rotates in both clockwise and counterclockwise directions, thereby expanding the operating window of the PTO assembly. For instance, the PTO device may be driven while the prime mover provides mechanical power to a transmission in forward and reverse rotational directions.

In one example, the PTO device is a uni-directional pump. In this way, the complexity and the cost of the assembly may be reduced when compared to systems that utilize bi-directional pumps.

In another example, the first and second mechanical branches may include an inequivalent number of gears to allow the PTO device to receive a uni-directional input when the prime mover rotates in both a forward drive direction and a reverse drive direction. Alternatively, the first and second mechanical branches may include an equivalent number of gears and one of the branches may include a chain or belt that is rotationally coupled to two of the gears to achieve uni-directional PTO assembly output functionality.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A power take-off (PTO) assembly for a transmission that is capable of providing a uni-directional input to a PTO device while the prime mover spins in both forward and reverse drive directions. In this way, the PTO assembly's window of operation may be expanded when compared to previous systems that use a clutch to decouple the PTO from the transmission during reverse. Further, the PTO assembly described herein is able to use a uni-directional pump as the PTO device, if so desired. Using a uni-directional pump as opposed to a bi-directional pump decreases the likelihood of PTO assembly degradation and may allow the space efficiency of the assembly to be increased while reducing the cost of the assembly, if desired. To allow the assembly to provide a uni-directional input to the PTO device, the assembly includes a pair of one-way clutches. One of the one-way clutches is configured to engage a shaft of a prime mover or an output shaft of the PTO assembly when the prime mover rotates in a first direction. Conversely, the other one-way clutch is configured to engage the prime mover shaft or the assembly's output shaft when the prime mover rotates in a second direction. Further, the assembly includes mechanical branches that serves to transfer rotational energy between the first one-way clutch and either the output shaft or the prime mover shaft. However, one of the mechanical branches is designed to change the rotational direction of the rotational energy traveling through the branch. In this way, the PTO device is capable of being driven in a single direction when the prime mover switches rotational directions (e.g., during forward and reverse drive modes). Consequently, the PTO device is able to be continuously driven across a wider range of transmission operating modes when compared to previous PTO systems. Further, complex control strategies that involve disconnecting the prime mover's output from the transmission to enable the transmission to be driven in reverse while the PTO is operated may be avoided, if desired.

Figure 1:
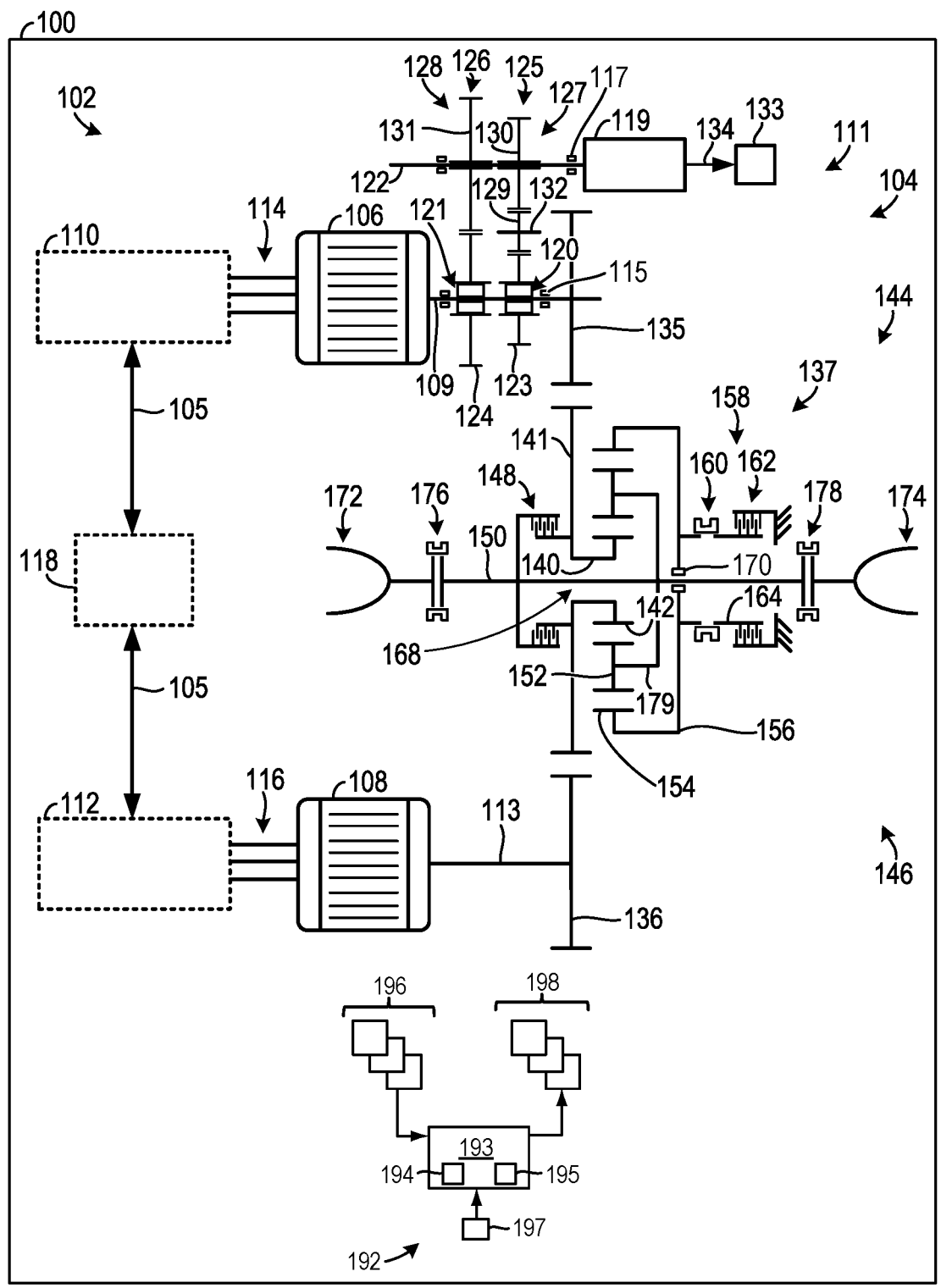
FIG. 1 shows a portion of a vehicle with a transmission that includes a power take-off (PTO) assembly.
Figure 2A:
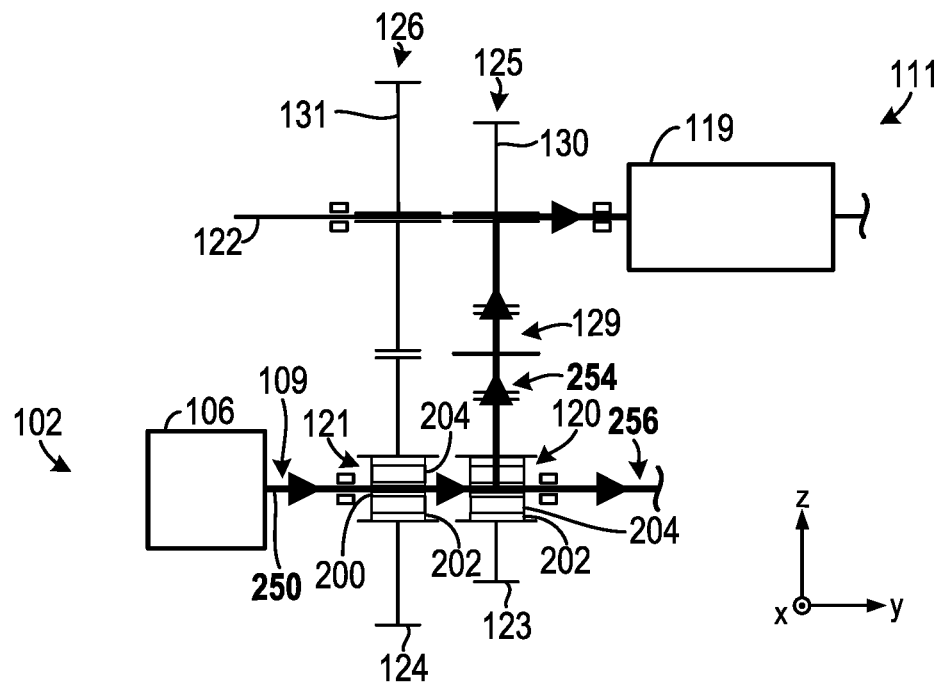
FIGS. 2A-2B show the power paths through the PTO assembly, depicted in FIG. 1 while the prime mover spins in opposing directions.
Figure 2B:
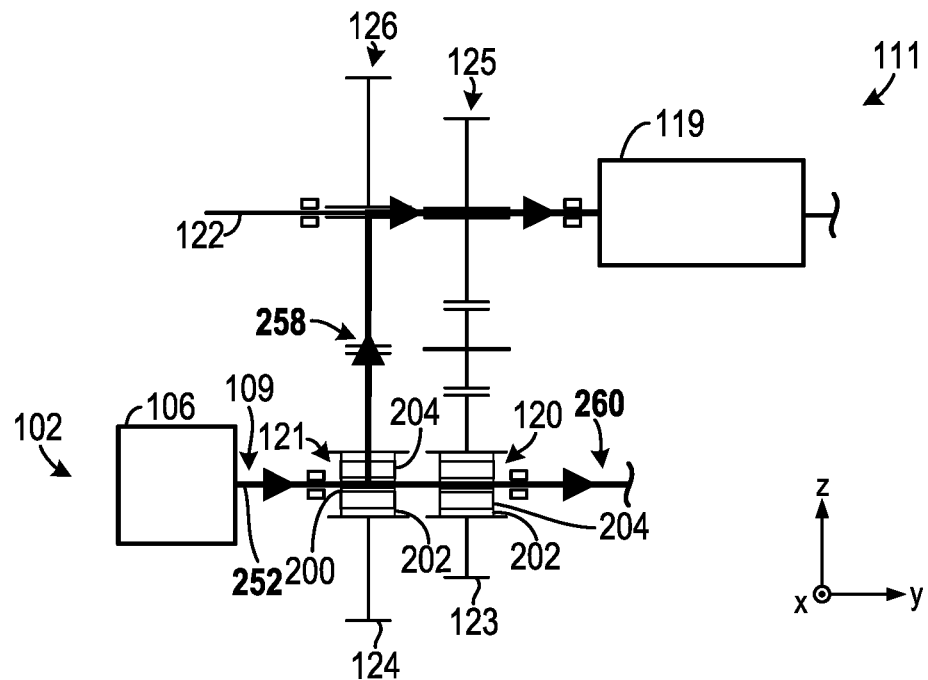
Figure 3:
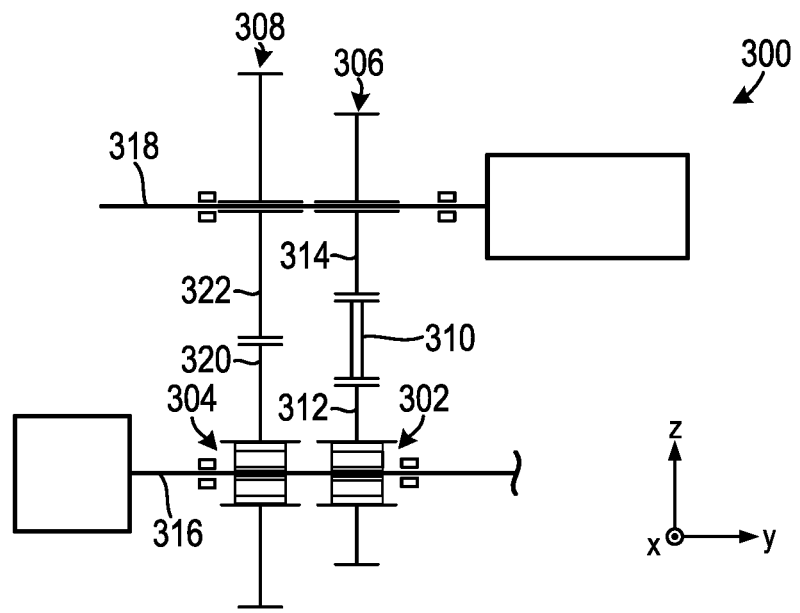
FIG. 3 shows another example of a PTO assembly.
Figure 4:
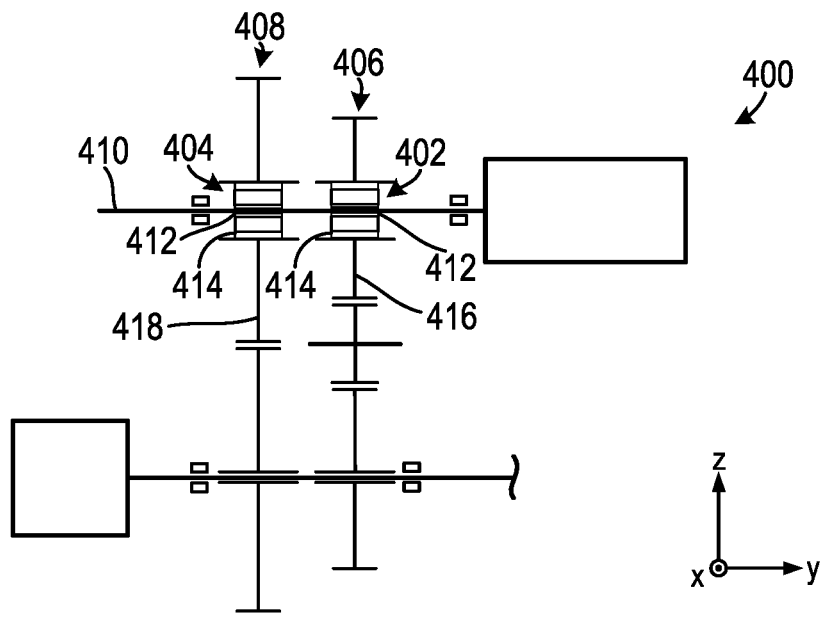
FIG. 4 shows yet another example of a PTO assembly.
Figure 5A:
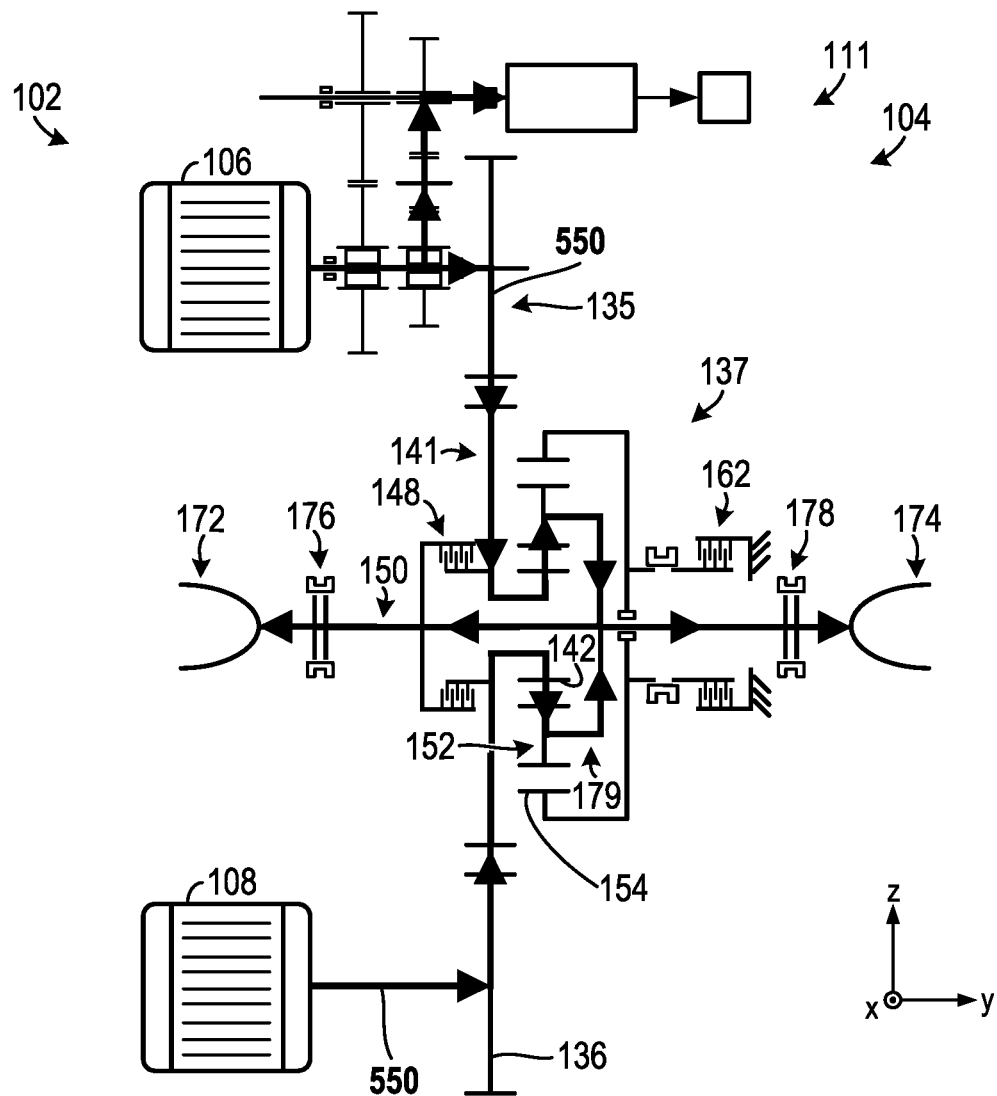
FIGS. 5A-5B show power paths for the transmission, depicted in FIG. 1, in a first and second gear mode.
Figure 5B:
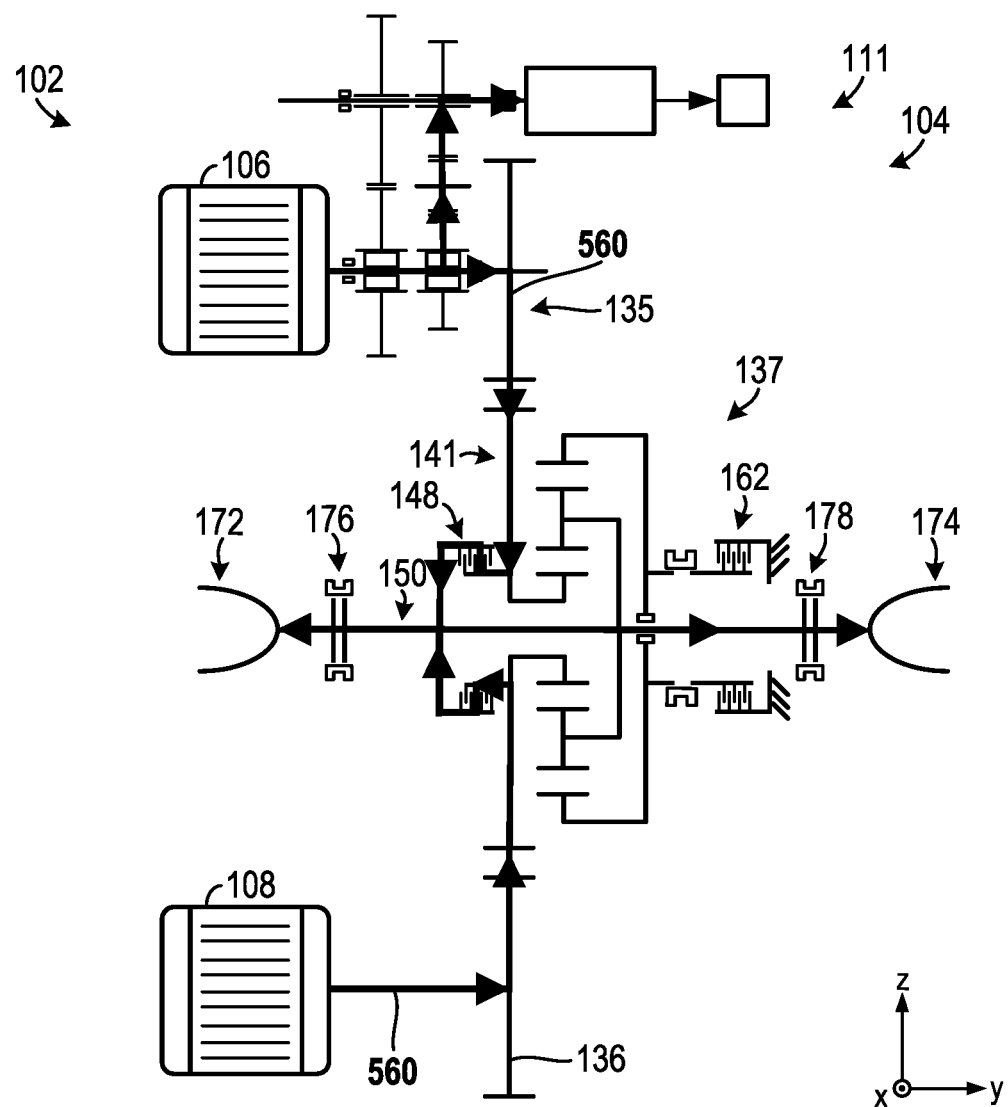

FIG. 1 shows a vehicle with a transmission that includes a PTO assembly configured to drive a PTO device in one rotational direction during both forward and reverse drive. FIGS. 2A-2B show the power paths through the PTO assembly during both forward and reverse drive operation. FIG. 3 shows another example of a PTO assembly that includes a chain and/or belt in one of the mechanical branches which connects a one-way clutch to an output shaft. FIG. 4 shows yet another example of a PTO assembly where one-way clutches in the assembly are arranged coaxial to an output shaft. FIGS. 5A-5B show power paths associated with a first and second gear modes in the transmission, depicted in FIG. 1.

FIG. 1 depicts a vehicle 100 with a driveline system 102 (e.g., an electric driveline system or a hydraulic driveline system). In one example, the vehicle 100 may be an electric vehicle (EV), such as a battery electric vehicle (BEV). All-electric vehicles may specifically be used due to their reduced complexity and therefore reduced points of potential component degradation in comparison to hybrid electric vehicles (HEVs). However, HEV embodiments may be employed where the vehicle includes an internal combustion engine (ICE). The vehicle 100 may be a light, medium, or heavy duty vehicle. In one specific use-case example, the vehicle may be a tractor with a front end loader. However, the vehicle may take a variety of forms, in other examples.

The driveline system 102 includes a transmission 104 (e.g., gearbox). The transmission 104 may be rotationally coupled to a first prime mover 106 and a second prime mover 108. However, in other examples, the second prime mover may be omitted from the driveline system 102. The prime mover 106 and the prime mover 108 are configured to rotate in both clockwise and counterclockwise directions. To enable, the transmission to be operated in a forward drive mode and a reverse drive mode. A first prime mover shaft 109 provides rotational connection between the prime mover 106 and a PTO assembly 111 as well as the transmission 104. Further, a second prime mover shaft 113 may provide rotational connection between the prime mover 108 and the transmission 104.

One or both of the prime movers 106, 108 may be electric motors, in one example. However, one or both of the prime movers may be hydraulic motors. In the electric motor example, the prime movers may include a rotor and a stator that electromagnetically interact during operation to generate motive power. Furthermore, the prime movers may be motor-generators which also generate electrical energy during regeneration operation. Further, the prime movers may have similar designs and sizes, in one example. In this way, manufacturing efficiency of the system may be increased. However, the prime movers may have differing sizes and/or component designs, in alternate examples.

Further, when the prime movers 106, 108 are electric motors they may specifically be configured as multi-phase electric machines that are supplied with electrical energy through the use of a first inverter 110 and a second inverter 112. These inverters and the other inverters described herein are designed to convert direct current (DC) to alternating current (AC) and vice versa. As such, the prime movers 106, 108 as well as the other prime movers may be AC machines. For instance, the prime movers 106, 108 and the inverters 110, 112 may be three-phase devices, in one use-case example. However, motors and inverters designed to operate using more than three phases have been envisioned. The electrical connections between the inverters 110, 112 and the prime movers 106, 108 is indicated via electrical connectors 114, 116 (e.g., multi-phase wires, bus bars, combinations thereof, and the like), respectively.

The inverters 110, 112 may receive DC power from at least one electrical energy source 118 (e.g., an energy storage device such a traction battery, a capacitor, combinations thereof, and the like, and/or an alternator). Arrows 105 indicate the flow of electrical energy from the energy source 118 to the prime movers 106, 108. Alternatively, each inverter may draw power from at least one distinct energy source. When both the inverters are coupled to one energy source, the inverters may operate at a similar voltage. Alternatively, if both inverters are coupled to distinct electrical energy sources, they may operate at different voltages, in some examples. In the hydraulic motor example, the prime movers 106, 108 may be generally configured to convert hydraulic pressure into torque.

The system 102 further includes the PTO assembly 111. The PTO assembly 111 includes a PTO device 119 that is driven by gears, shafts, clutches, and the like. These gears, shafts, and clutches are configured to provide uni-directional input to a PTO device 119 while the prime mover 106 rotates in both a first rotational direction and a second rotational direction. These rotational directions may correspond to forward and reverse drive modes or vice versa.

The PTO device 119 may be a uni-directional pump. To elaborate, in such an example, the uni-directional pump may be a uni-directional charging pump that provides pressurized hydraulic fluid to the clutches. In other examples, the PTO device may be a uni-directional working pump that provides pressurized hydraulic fluid to the hydraulic motor (e.g., hydraulic cylinders in the motor) for motive operation or a uni-directional steering pump that provides pressurized hydraulic fluid to a steering system. The working pump may be used to power vehicle implements such as a front end loader, a hydraulically adjustable bed, a compactor, an auger, combinations thereof, and the like.

The PTO assembly 111 further includes a first one-way clutch 120 and a second one-way clutch 121. In the illustrated example, the one-way clutches 120, 121 are positioned coaxial to the prime mover shaft 109. Alternatively, the one-way clutches 120, 121 may be positioned coaxial to an output shaft 122 in the PTO assembly 111. This alternative PTO assembly configuration is expanded upon herein with regard to FIG. 4.

The first one-way clutch 120 is configured to engage and rotationally drive a gear 123 via the prime mover shaft 109 when the prime mover 106 rotates in a first direction. In this way, the first prime mover 106 is configured to selectively engage with the prime mover shaft 109 when the prime mover 106 rotates in the first rotational direction. Conversely, the one-way clutch 120 is configured to freewheel when the prime mover rotates in a second rotational direction that opposes the first rotational direction. As discussed herein, during freewheel of the clutch torque transfer between the shaft and the gear associated with the one-way clutch is inhibited. The second one-way clutch 121 is configured to engage and drive a gear 124 via the first prime mover shaft 106 when the prime mover 106 rotates in a second direction that is opposite the first direction. Conversely, the second one-way clutch freewheels when the prime mover 106 rotates in the first direction.

Using two one-way clutches that are designed to freewheel in opposite rotational directions allows the mechanical branches (expanded upon herein) to which they are attached to be conversely driven when the prime mover 106 spins in opposite directions. In other words, one of the clutches and power paths is driven while the other remains inactive while the prime mover spins clockwise and counterclockwise. As a result, the PTO device 119 is provided with a uni-directional input during both forward drive and reverse drive in the driveline system 102.

One or both of the one-way clutches 120, 121 may be a roller type one-way clutch which may include spring loaded rollers and ramps on the inner race. In another example, a sprag type one-way clutches may be used where multiple asymmetric sprags with curved surfaces that enable the clutch to transfer torque between an inner and outer race of the clutch while rotated in one direction and freewheel when rotated in the other direction. In other examples, one or both of the one-way clutches may be a ratcheting type one-way clutch.

A first mechanical branch 125 rotationally couples the first one-way clutch 120 to the output shaft 122. Conversely, a second mechanical branch 126 rotationally couples the second one-way clutch 121 to the output shaft 122. The second mechanical branch 126 reverses the rotational direction of the mechanical power flowing therethrough. In this way, the PTO device 119 is driven via a uni-directional input during clockwise and counterclockwise rotation of the prime mover 106. More generally, the first and second mechanical branches are arranged in parallel and allow power to be transferred between the shaft 109 and the output shaft 122 through each of the paths during different rotational conditions of the shaft 109.

The mechanical branches 125, 126 include gears in the illustrated example. However, in other examples, at least one of the mechanical branches may include chains and/or belts that enable mechanical power to be transferred between the associated clutch and the output shaft 122. The gears described herein include teeth, and mechanical attachment between the gears involves meshing of the teeth. The ratio of the gears in each of the mechanical branches 125, 126 may be selected based on PTO output speed targets, the size and speed range of the prime mover 106, and the like.

The first mechanical branch 125 in the illustrated example includes a first set of gears 127 and the second mechanical branch 126 conversely include a second set of gears 128. To enable the reversal of the rotation, the second set of gears 128 includes an even number of gears and the first set of gears 127 includes an odd number of gears. Specifically, the first set of gears 127 includes three gears 123, 129, and 130 and the second set of gears 128 includes two gears 124, 131. However, the first set of gears may include five or seven gears and the second set of gears may include four or six gears. The number of gears in the gearsets may be selected based on a variety of factors such as target ratios of the mechanical branches, prime mover speed range, space constraints of surrounding vehicle systems, shaft construction, and the like.

The gear 129 in the first mechanical branch 125 may be referred to as an idler gear and rotates on an idler shaft 132. Further, the gear 123 in the first mechanical branch 125 may be coupled to or incorporated into the first one-way clutch 120 (e.g., an outer race). As such, the gear 123 may radially extend from the outer race of the first one-way clutch 120. Further, the gear 130 in the first mechanical branch 125 may be fixedly coupled to or incorporated into the output shaft 122. For instance, the gear 130 may be welded, splined, press-fit, integrally formed therein, combinations thereof, and the like to the output shaft 122.

The gear 124 in the second mechanical branch 126 may be coupled to or incorporated into the second one-way clutch 121 (e.g., an outer race). Further, the gear 131 in the second mechanical branch 126 may be fixedly coupled to or incorporated into the output shaft 122. For instance, the gear 131 may be welded, splined, press-fit, integrally formed therein, combinations thereof, and the like to the output shaft 122.

Bearings 115 and 117 are coupled to the prime mover shaft 109 and the output shaft 122, respectively. The bearings 115, 117 as well as the other bearings described herein may include inner races, outer races, and roller elements (e.g., cylindrical rollers, spherical rollers, tapered cylindrical rollers, and the like). The bearings are coupled to and support the shafts to which they are attached as well as facilitate rotation of the shaft. The bearings may be positioned within a housing of the transmission. Further, bearings may be coupled to opposing sides of the idler shaft 132.

The PTO device 119 may be coupled to (e.g., hydraulically coupled to) one or more auxiliary device(s) 133 as denoted via arrow 134. For instance, hydraulic lines, conduits, and the like may be used to establish the hydraulic connection between the PTO device 119 and the auxiliary device(s) 133.

The shafts 109, 113 of the prime movers 106, 108 may have gears 135, 136 which reside thereon, respectively. In some examples, the gear 135 may be fixedly coupled to the shaft 109 such that they co-rotate. For instance, the gear 135 may be splined, welded, press-fit, integrally formed therein, combinations thereof, and the like to the shaft 109. In another example, a clutch (e.g., a friction clutch and/or synchronizer) may be used to attach the gear 135 to the shaft 109 such that the shaft and gear are capable of being rotationally coupled and decoupled based on the transmission's operating conditions. For instance, the prime mover 106 may be decoupled from the transmission when the vehicle is stationary but driving the auxiliary device(s) 133 via the PTO device 119 if desired. However, it will be appreciated that adding a disconnect clutch may increase the cost and complexity of the system. Still further in other examples, chains and/or belts, additional gears, shafts, and the like may be used to attach the prime mover shaft 109 to the transmission 104.

The gear 136 may be fixedly coupled to the shaft 113. For instance, the gear 136 may be splined, welded, press-fit, integrally formed therein, combinations thereof, and the like to the shaft 113.

The gears 135, 136 are each coupled to (e.g., in meshing engagement with) a gear 141 of a planetary gearset 137 in the transmission 104. The planetary gearset 137 may include a shaft 140 which connects the gear 141 to a sun gear 142. The gears 135, 136 may specifically be positioned on different sides 144, 146 of the transmission 104 to enhance packaging and provide a more balanced weight distribution in the driveline system 102, if wanted. More generally, the rotational axes of the gears 135 and 136 as well as the prime movers 106 and 108 may be parallel to one another.

In the illustrated example, a friction clutch 148 is coupled to the shaft 140 and designed to selectively rotationally couple the shaft to an output shaft 150. However, in other examples, the friction clutch 148 may be omitted from the transmission or the transmission may have a different architecture. A friction clutch, as described herein, may include two sets of plates designed to frictionally engage and disengage one another while the clutch is opened and closed. As such, the amount of torque transferred through the clutch may be modulated depending on the degree of friction plate engagement. Thus, the friction clutches described herein may be operated with varying amounts of engagement (e.g., continuously adjusted through the clutch's range of engagement). Further, the friction clutches described herein may be wet friction clutches through which lubricant is routed to increase clutch longevity. However, dry friction clutches may be used in alternate examples. The friction clutch 148 and the other clutches described herein may be adjusted via hydraulic, pneumatic, and/or electro-mechanical actuators. For instance, hydraulically operated pistons may be used to induce clutch engagement of the friction clutches. However, solenoids may be used for electro-mechanical clutch actuation, in other examples.

The sun gear 142 in the planetary gearset 137 may be coupled to the shaft 140. Further, planet gears 152, in the planetary gearset 137, may be coupled to the sun gear 142. Further, the planet gears 152 may be mechanically coupled to a ring gear 154 in the planetary gearset 137.

A shaft 156 may extend from the ring gear 154 and have a friction clutch assembly 158 residing thereon. The friction clutch assembly 158 may include a synchronizer 160 arranged in series with a friction clutch 162. Placing the synchronizer 160 in series with the friction clutch 162 enables the transmission's efficiency to be increased when operating in the second gear. To elaborate, the synchronizer 160 permits a portion of the shaft 164 to be disconnected from the clutch 162 and freely rotate while the system operates in the second gear. As such, the plates in the clutch 162 may not rotate when the synchronizer 160 is disengaged. Conversely, when the synchronizer 160 is engaged, the shaft 164 and the shaft 156 of the ring gear 154 rotate in unison. The synchronizer 160 is designed to synchronize the speed of the shaft 156 and a shaft 164 coupled to the friction clutch 162, and mechanically lock rotation of the shafts 156, 164, when engaged. To increase system compactness, the friction clutches 148, 162 as well as the output shaft 150 may be coaxially arranged. To permit this coaxial arrangement, the sun gear 142 may include an opening 168 through which the output shaft extends. However, other clutch, shaft, and/or gear arrangements may be used in alternate examples.

The friction clutch 162 is designed to ground the ring gear 154, in the illustrated example. However, other clutch configurations have been contemplated. For instance, the friction clutch may ground a carrier 179, in another embodiment. To accomplish the ring gear grounding, the friction clutch 162 may include a housing with a portion of the friction plates coupled thereto and fixedly attached to a stationary component, such as the transmission's housing. A bearing 170 may be positioned between the shaft 156 and the output shaft 150 to enable these shafts to independently rotate, during certain conditions.

In the illustrated example, the output shaft 150 includes output interfaces 172, 174 (e.g., yokes, splines, combinations thereof, or other suitable mechanical interfaces) designed to attach to axles (e.g., front or rear axles) via shafts, joints (e.g., U-joints), chains, belts, combinations thereof, and the like. The axles may include differentials that are rotationally coupled to axle shafts which are in turn rotationally coupled to drive wheels. In other examples, the output shaft may include a single output interface that is connected to an axle (e.g., a front axle or a rear axle).

Disconnect clutches 176, 178 may be provided for each of the output interfaces 172, 174. As such, the disconnect clutches 176, 178 may be designed to mechanically couple and decouple the output shaft 150 from the output interfaces 172, 174. In this way, the transmission's capabilities may be further expanded to enable single and multi-axle operation. For instance, four-wheel drive may be engaged when additional traction is desired and two-wheel drive may be engaged when the additional traction is not desired to reduce driveline losses and tire wear, for instance. In this way, the handling performance of the vehicle is enhanced. The disconnect clutches 176, 178 may be dog clutches, synchronizers, friction clutches, combinations thereof, or other suitable clutches. Dog clutches and/or synchronizers may be specifically used as axle disconnect devices, in some examples, to reduce losses when the clutches are disengaged, when compared to friction clutches.

The planet gears 152 rotate on the carrier 179 of the planetary gearset 137. The carrier 179 is rotationally coupled to the output shaft 150. The planetary gearset 137 may be a simple planetary gearset that solely includes the sun gear 142, ring gear 154, planet gears 152, and carrier 179. By using a simple planetary assembly, transmission compactness may be increased when compared to more complex planetary assemblies such as multi-stage planetary assemblies, Ravigneaux planetary assemblies, and the like. Consequently, the driveline system may pose less space constraints on other vehicle components, thereby permitting the system's applicability to be expanded. Further, losses in the transmission may be decreased when a simple planetary gearset is used as opposed to more complex gear arrangements. However, transmissions with other gearing arrangements have been contemplated, including transmissions that do not employ planetary gearing.

Depending on the gear ratio of the transmission, mechanical power may travel through the carrier 179 to the output shaft 150 or from the sun gear 142 to the output shaft. The transmission 104 is designed to shift (e.g., powershift) between different operating gears. The shifting operation may involve engaging the clutch 148 and disengaging the clutch 162 or vice versa. Mechanical power paths through the transmission 104 in the different gears and shifting operation (e.g., powershifting operation) between the operating gears are discussed in greater detail herein with regard to FIGS. 5A-5B.

The vehicle 100 further includes a control system 192 with a controller 193 as shown in FIG. 1. The controller 193 may include a microcomputer with components such as a processor 194 (e.g., a microprocessor unit), input/output ports, an electronic storage medium 195 for executable programs and calibration values (e.g., a read-only memory chip, random access memory, keep alive memory, a data bus, and the like). The storage medium may be programmed with computer readable data representing instructions executable by the processor for performing the methods and control techniques described herein as well as other variants that are anticipated but not specifically listed.

The controller 193 may receive various signals from sensors 196 coupled to various regions of the vehicle 100 and specifically the transmission 104. For example, the sensors 196 may include a pedal position sensor that is designed to detect a depression of an operator-actuated pedal such as an accelerator pedal and/or a brake pedal, a speed sensor at the transmission output shaft, energy storage device state of charge (SOC) sensor, clutch position sensors, and the like. Motor speed may be ascertained from the amount of power sent from the inverter to the electric machine. An input device 197 (e.g., accelerator pedal, brake pedal, drive mode selector, PTO mode selector, two wheel and four-wheel drive selector, combinations thereof, and the like) may further provide input signals indicative of an operator's intent for vehicle control. For instance, buttons, switches, and/or a touch interface may be included in the vehicle to enable the operator to toggle between a two-wheel drive mode and a four-wheel drive mode.

Upon receiving the signals from the various sensors 196 of FIG. 1, the controller 193 processes the received signals, and employs various actuators 198 of vehicle components to adjust the components based on the received signals and instructions stored on the memory of controller 193. For example, the controller 193 may receive an accelerator pedal signal indicative of an operator's request for increased vehicle acceleration. In response, the controller 193 may command operation of the prime movers and increase the mechanical power delivered from the prime movers 106 and 108 to the transmission 104. When the prime movers are multiphase electric motors, the control commands may be sent to the inverters. The controller 193 may, during certain operating conditions, be designed to send commands to the clutches 148, 160, 162, 176, and/or 178 to engage and disengage the clutches. For instance, a control command may be sent to a clutch assembly and in response to receiving the command, an actuator in the clutch assembly may adjust the clutch based on the command for clutch engagement or disengagement. The other controllable components in the vehicle may function in a similar manner with regard to sensor signals, control commands, and actuator adjustment, for example. The controller 193 may be designed to control the clutches 148, 162 to synchronously shift between two of the transmission's operating gears.

An axis system is provided in FIG. 1, as well as FIGS. 2A-5B, for reference. The z-axis may be a vertical axis (e.g., parallel to a gravitational axis), the x-axis may be a lateral axis (e.g., horizontal axis), and/or the y-axis may be a longitudinal axis. However, alternate orientations of the axes may be used, in other examples.

The transmission 104 has two clutches that enable it to function as a two-speed transmission. However, in other embodiments, additional clutches may be added to or omitted from the transmission to enable it to be operated in a greater or fewer number of gears. As such, the transmission may have three or more speeds, in other embodiments.

FIGS. 2A-2B depict mechanical power paths 250 and 252, respectively, through the PTO assembly 111 while the driveline system 102 is operated in both a forward drive mode and a reverse drive mode, respectively. The prime mover 106 is shown along with the PTO assembly 111. The first one-way clutch 120 and the second one-way clutch 121 are shown including inner races 200 and outer races 202 and internal componentry 204 that facilitates one-way clutch functionality. The internal componentry 204 may include rollers, sprags, ratcheting devices, and the like as previously discussed.

Turning specifically to FIG. 2A, the forward drive mode may be associated with rotating the prime mover 106 in a clockwise direction, in one example. However, the forward drive mode may be associated with rotating the prime mover in a counterclockwise direction, in other examples.

When the prime mover 106 rotates in the clockwise direction, the first one-way clutch 120 engages such that mechanical power is transferred from the prime mover shaft 109 to the gear 123 by way of the clutch. Conversely, when the prime mover 106 rotates in the clockwise direction, the second one-way clutch 121 freewheels such that mechanical power is not transferred from the shaft 109 to the gear 124. In this way, the PTO assembly 111 may transfer mechanical power through one of the parallel mechanical branches while forgoing mechanical power transfer through the other mechanical branch.

The power path 250 unfolds as follows, mechanical power is transferred from the prime mover 106 to its shaft 109. The power path then branches into a first branch 254 and a second branch 256. The first branch 254 provides mechanical power to the PTO assembly 111 and the second branch 256 provides mechanical power to downstream transmission components (e.g., the gear 135 depicted in FIG. 1) via the shaft 109. In the first branch 254, mechanical power is transferred from the shaft 109 to the gear 123 by way of the first one-way clutch 120. Next, power is transferred to the idler gear 129 from the gear 123. Next, power is transferred from the idler gear 129 to the gear 130 and from the gear 130 to the output shaft 122. Power is then transferred to the PTO device 119 from the shaft. In this way, power is transferred through the first mechanical branch 125 while power is not transferred through the second mechanical branch 126. Thus, power only flows through one of the parallel mechanical branches to allow the PTO device 119 to be uni-directionally driven.

Turning specifically to FIG. 2B, the reverse drive mode may be associated with rotating the prime mover 106 in a counterclockwise direction, in one example. However, the reverse drive mode may be associated with rotating the prime mover in a clockwise direction, in other examples.

When the prime mover 106 rotates in the counterclockwise direction, the second one-way clutch 121 engages such that mechanical power is transferred from the prime mover shaft 109 to the gear 124 by way of the second one-way clutch. Conversely, when the prime mover 106 rotates in the counterclockwise direction, the first one-way clutch 120 freewheels such that mechanical power is not transferred from the shaft 109 to the gear 123. In this way, the PTO assembly 111 may transfer mechanical power through one of the parallel mechanical branches while forgoing mechanical power transfer through the other mechanical branch.

The power path 252 again includes a first branch 258 that directs power to the PTO assembly 111 and a second branch 260 that directs power to downstream transmission components. However, in the first branch 258, mechanical power is transferred from the shaft 109 to the gear 124 by way of the second one-way clutch 121. Next, power is transferred between the gear 123 and the gear 131. Next, power is transferred to the output shaft 122 from the gear 131 and from the output shaft 122 to the PTO device 119. In this way, power is transferred through the second mechanical branch 126 while power is not transferred through the first mechanical branch 125. Thus, power only flows through one of the parallel mechanical branches to allow the PTO device 119 to be uni-directionally driven. In this way, the PTO device receives mechanical power during both forward and reverse drive, thereby expanding the PTO assembly's window of operation. Customer appeal is increased as a result. Driving the PTO in both forward and reverse may be particularly desirable in vehicles such as front end loaders. However, the driveline system described herein may be used in a wide variety of vehicles.

FIG. 3 shows another example of a PTO assembly 300 for a vehicle transmission. Thus, the PTO assembly 300 may be used in the transmission 104 shown in FIG. 1 as an alternative to the PTO assembly 111, illustrated in FIG. 1.

The PTO assembly 300 again includes a first one-way clutch 302 and a second one-way clutch 304 as well as a first mechanical branch 306 and a second mechanical branch 308. The one-way clutch 302 is configured to transfer torque between the prime mover shaft 316 and a gear 312 in a first rotational direction and the second one-way clutch 304 is conversely configured to transfer torque between the prime mover shaft and a gear 320 in a second rotational direction that is opposite to the first rotational direction. The PTO assembly 300 include at least some components that have overlapping structure and/or function with the PTO assembly 111, shown in FIG. 1. Repeated description of the overlapping components is omitted for brevity.

The first mechanical branch 306 includes a component 310 that is a belt and/or a chain. The component 310 is rotationally coupled to the gear 312 and a gear 314 on opposing sides. Thus, the component is placed between the gears 312 and 314. Thus, first mechanical branch has a similar rotational direction at its input and output which are the prime mover shaft 316 and an output shaft 318. Conversely, the second mechanical branch 308 reverses the rotational direction from the input to the output due to the use of an even number of gears (e.g., the two gears 320 and 322).

FIG. 4 shows another example of a PTO assembly 400. Thus, the PTO assembly 400 may be used in the transmission 104 shown in FIG. 1 as an alternative to the PTO assembly 111, illustrated in FIG. 1. The PTO assembly 400 include at least some components that have overlapping structure and/or function with the PTO assembly 111, shown in FIG. 1. Repeated description of the overlapping components is omitted for brevity.

The PTO assembly 400 shown in FIG. 4 again includes a first one-way clutch 402, a second one-way clutch 404, a first mechanical branch 406, and a second mechanical branch 408. However, the first and second one-way clutches 402 and 404 are positioned coaxial to an output shaft 410. To elaborate, the first and second one-way clutches 402 and 404 may include inner races 412 that are fixedly coupled to the output shaft 410 and outer races 414 from which gears 416 and 418 in the first and second mechanical branches 406 and 408, respectively, extend. The one-way clutches 402 and 404 may be placed coaxial to the output shaft 410 to enhance load distribution in the PTO assembly. As such, the position of the one-way clutches in the PTO assembly may be selected based on factors such as the load distribution in the assembly, the size of the prime mover, space constraints, and the like.

FIGS. 5A and 5B show the power paths 550 and 560 through the transmission 104 in the driveline system 102 in a first gear mode and a second gear mode, respectively, where the PTO 119 is connected to the first prime mover 106. The power path through the PTO 119 is similar to the power path 250 described above with regard to FIG. 2A and repeated description is omitted for concision. It will be understood that these power paths 550 and 560 may correspond to forward drive. However, the first and second gear modes may be implemented in reverse drive. However, in reverse drive the power path through the PTO assembly 111 will change. Further, the prime movers 106 and 108 are both providing power to the transmission 104 in FIGS. 5A and 5B. However, in other examples, the prime mover 106 may be solely providing power to the transmission in the first and/or second gear.

The transmission's gear ratio in the first gear mode is higher than the gear ratio in the second gear mode. Thus, the first gear may be used during launch and subsequent acceleration while the second gear may be used for cruising operation, for instance. Further, as shown in FIGS. 5A and 5B, the disconnect clutches 176, 178 are engaged and therefore permit power to be transferred from the output shaft 150 both output interfaces 172, 174 and drive axles, correspondingly. However, one of disconnect clutches may be disengaged while the transmission is operating in the first gear and the second gear, when additional traction is not desired. For example, one of the disconnect clutches may be disengaged and the vehicle correspondingly operates in a two-wheel drive mode when a vehicle operator requests said mode or when it is determined that the vehicle is not operating under low traction conditions.

Turning specifically to FIG. 5A, while the transmission 104 is operating in the first gear mode, the ring gear 154 is held stationary by the friction clutch 162 and the clutch 148 is disengaged. The mechanical power path 550 in the first gear mode unfolds as follows: mechanical power moves from the first and second prime movers 106, 108 to the gear 135, 136, respectively, from the gears 135, 136 to the gear 141, from the gear 141 to the sun gear 142 in the planetary gearset 137, from the sun gear to the planet gears 152, from the planet gears to the carrier 179, and from the carrier to the output shaft 150.

While the transmission 104 is operating in the second gear mode, as shown in FIG. 5B, the clutch 148 is engaged to permit mechanical power transfer between the gear 141 and the output shaft 150 and the clutch 162 is disengaged.

In the second gear mode, the mechanical power path unfolds as follows: mechanical power moves from the first and second prime movers 106, 108 to the gears 135, 136, respectively, from the gears 135, 136 to the gear 141, from the gear 141 to the clutch 148, and from the clutch 148 to the output shaft 150. In this way, the transmission 104 may operate in the first and second gear modes, to expand the transmission capabilities and increase prime mover efficiency. To transition between the first and second gears, the clutches may be engaged and disengaged at overlapping time intervals to enable a torque hand-off to occur.

FIGS. 1-5B provide for a method used to operate a driveline system. The method includes during both a forward drive condition and a reverse drive condition of a prime mover, transferring mechanical power to a PTO device in a PTO assembly. This method step may be implemented through operation of the first prime mover and then subsequently passively unfold without any direct control of the PTO assembly. In this way, the PTO device may receive uni-directional rotational input during both forward and reverse drive modes. The method may further include transferring hydraulic fluid from the PTO device (e.g., a uni-directional hydraulic pump) to an auxiliary device. Consequently, the window of PTO operation can be increased, if desired.

The technical effect of the driveline system operating method described herein is to expand the drive system's PTO capabilities and specifically allow the PTO to be operated in both forward and rear drive without interfering with the mechanical power that can be transferred to the transmission via the electric machines, if desired.

FIGS. 1-5B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred to as such, in one example. In other examples, elements offset from one another may be referred to as such. Even further, elements which are coaxial or parallel to one another may be referred to as such. Still further, an axis about which a component rotates may be referred to as a rotational axis.

The invention will be further described in the following paragraphs. In one aspect, a power take-off (PTO) assembly is provided that comprises a first one-way clutch configured to engage with a shaft of a prime mover or an output shaft when the prime mover rotates in a first direction; a second one-way clutch configured to engage with the shaft of the prime mover or the output shaft when the prime mover rotates in second direction which is opposite the first direction; a first mechanical branch rotationally coupling the first one-way clutch to the output shaft or the prime mover shaft; a second mechanical branch rotationally coupling the second one-way clutch to the output shaft or the prime mover shaft; and a PTO device rotationally coupled to the output shaft.

In another aspect, a method for operation of a driveline system is provided that comprises during both a forward drive condition and a reverse drive condition of a prime mover, transferring mechanical power to a power take-off (PTO) device in a PTO assembly; wherein the PTO assembly includes: a first one-way clutch configured to engage with a shaft of a prime mover or an output shaft when the prime mover rotates in a first direction; a second one-way clutch configured to engage with the shaft of the prime mover or the output shaft when the prime mover rotates in second direction which is opposite the first direction; a first mechanical branch rotationally coupling the first one-way clutch to the output shaft or the prime mover shaft; a second mechanical branch rotationally coupling the second one-way clutch to the output shaft or the prime mover shaft; and the PTO device rotationally coupled to the output shaft. Further, in one example, the method may further comprise transferring hydraulic fluid from the PTO device to an auxiliary device.

In yet another aspect, a power take-off (PTO) system for a vehicle powertrain is provided that comprises a first one-way clutch configured to engage with a shaft of a prime mover when the prime mover rotates in a forward drive direction; a second one-way clutch configured to engage with the shaft of the prime mover when the prime mover rotates in a reverse drive direction; a first mechanical branch rotationally coupling the first one-way clutch to the output shaft or the prime mover shaft; a second mechanical branch rotationally coupling the second one-way clutch to the output shaft or the prime mover shaft; and a uni-directional pump rotationally coupled to the output shaft.

In any of the aspects or combinations of the aspects, the first one-way clutch may engage with the prime mover shaft when the prime mover rotates in the first direction and the second one-way clutch may engage with the prime mover shaft when the prime mover rotates in the second direction.

In any of the aspects or combinations of the aspects, the first one-way clutch may engage with the output shaft when the prime mover rotates in the first direction and the second one-way clutch may engage with the output shaft when the prime mover rotates in the second direction.

In any of the aspects or combinations of the aspects, the first mechanical branch may include a different number of gears than the second mechanical branch.

In any of the aspects or combinations of the aspects, the first and second one-way clutches may be sprag clutches.

In any of the aspects or combinations of the aspects, the first mechanical branch and the second mechanical branch may include an equivalent number of gears and the second mechanical branch may include a chain or a belt.

In any of the aspects or combinations of the aspects, the chain or the belt may be rotationally coupled to two gears in the second mechanical branch.

In any of the aspects or combinations of the aspects, the shaft of the prime mover may be rotationally coupled to a multi-speed transmission.

In any of the aspects or combinations of the aspects, the prime mover may be an electric motor.

In any of the aspects or combinations of the aspects, the prime mover may be a hydraulic motor.

In any of the aspects or combinations of the aspects, the first and second one-way clutches may be ratcheting type one-way clutches.

In any of the aspects or combinations of the aspects, wherein the PTO system may not include a disconnect clutch.

In any of the aspects or combinations of the aspects, the prime mover may be an electric motor-generator.

In any of the aspects or combinations of the aspects, the PTO device may be a uni-directional pump.

In another representation, a driveline PTO system is provided that comprises two mechanical branches arranged in parallel to one another and connect an input shaft of the PTO system to an output shaft, wherein one of the mechanical branches reverses the rotational direction from the input shaft to the output shaft, and a pair of clutches that are coupled to the input shaft or the output shaft and the mechanical branches, wherein one of the clutches engages the shaft to which it coupled when the input shaft is rotated in a first direction and wherein the other clutch engages the shaft to which it is coupled when the input shaft is rotated in a second direction that is opposite the first direction.

Note that the example control and estimation routines included herein can be used with various powertrain, electric drive, and/or vehicle system configurations. The control methods and routines disclosed herein may be stored as executable instructions in non-transitory memory and may be carried out by the control system including the controller in combination with the various sensors, actuators, and other transmission and/or vehicle hardware in combination with the electronic controller. As such, the described actions, operations, and/or functions may graphically represent code to be programmed into non-transitory memory of the computer readable storage medium in the vehicle and/or driveline control system. The various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of prime movers, internal combustion engines, and/or transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A power take-off (PTO) assembly, comprising:
    a first one-way clutch configured to engage with a shaft of a prime mover or an output shaft when the prime mover rotates in a first direction;
    a second one-way clutch configured to engage with the shaft of the prime mover or the output shaft when the prime mover rotates in second direction which is opposite the first direction;
    a first mechanical branch rotationally coupling the first one-way clutch to the output shaft or the prime mover shaft;
    a second mechanical branch rotationally coupling the second one-way clutch to the output shaft or the prime mover shaft; and
    a PTO device rotationally coupled to the output shaft.

2. The PTO assembly of claim 1, wherein the first one-way clutch engages with the prime mover shaft when the prime mover rotates in the first direction and the second one-way clutch engages with the prime mover shaft when the prime mover rotates in the second direction.

3. The PTO assembly of claim 1, wherein the first one-way clutch engages with the output shaft when the prime mover rotates in the first direction and the second one-way clutch engages with the output shaft when the prime mover rotates in the second direction.

4. The PTO assembly of claim 1, wherein the first mechanical branch includes a different number of gears than the second mechanical branch.

5. The PTO assembly of claim 1, wherein the first and second one-way clutches are sprag clutches.

6. The PTO assembly of claim 1, wherein the first mechanical branch and the second mechanical branch include an equivalent number of gears and the second mechanical branch includes a chain or a belt.

7. The PTO assembly of claim 6, wherein the chain or the belt is rotationally coupled to two gears in the second mechanical branch.

8. The PTO assembly of claim 1, wherein the PTO device is a uni-directional pump.

9. The PTO assembly of claim 1, wherein the shaft of the prime mover is rotationally coupled to a multi-speed transmission.

10. The PTO assembly of claim 1, wherein the prime mover is an electric motor.

11. The PTO assembly of claim 1, wherein the prime mover is a hydraulic motor.

12. A method for operation of a driveline system, comprising:
    during both a forward drive condition and a reverse drive condition of a prime mover, transferring mechanical power to a power take-off (PTO) device in a PTO assembly;
    wherein the PTO assembly includes:
        a first one-way clutch configured to engage with a shaft of the prime mover or an output shaft when the prime mover rotates in a first direction;
        a second one-way clutch configured to engage with the shaft of the prime mover or the output shaft when the prime mover rotates in second direction which is opposite the first direction;
        a first mechanical branch rotationally coupling the first one-way clutch to the output shaft or the prime mover shaft;
        a second mechanical branch rotationally coupling the second one-way clutch to the output shaft or the prime mover shaft; and
        the PTO device rotationally coupled to the output shaft.

13. The method of claim 12, wherein the PTO device is a uni-directional pump.

14. The method of claim 13, further comprising transferring hydraulic fluid from the PTO device to an auxiliary device.

15. The method of claim 12, wherein the prime mover is an electric motor.

16. The method of claim 12, wherein the prime mover is a hydraulic motor.

17. A power take-off (PTO) system for a vehicle powertrain, comprising:
- a first one-way clutch configured to engage with a shaft of a prime mover or an output shaft when the prime mover rotates in a forward drive direction;
- a second one-way clutch configured to engage with the shaft of the prime mover or an output shaft when the prime mover rotates in a reverse drive direction;
- a first mechanical branch rotationally coupling the first one-way clutch to the output shaft or the prime mover shaft;
- a second mechanical branch rotationally coupling the second one-way clutch to the output shaft or the prime mover shaft; and
- a uni-directional pump rotationally coupled to the output shaft.

18. The PTO system of claim 17, wherein the first and second one-way clutches are ratcheting type one-way clutches.

19. The PTO system of claim 17, wherein the PTO system does not include a disconnect clutch.

20. The PTO system of claim 17, wherein the prime mover is an electric motor-generator.

* * * * *